Aug. 2, 1927.
G. S. ENGLE
1,637,991
PRIMARY BATTERY
Filed March 6, 1926
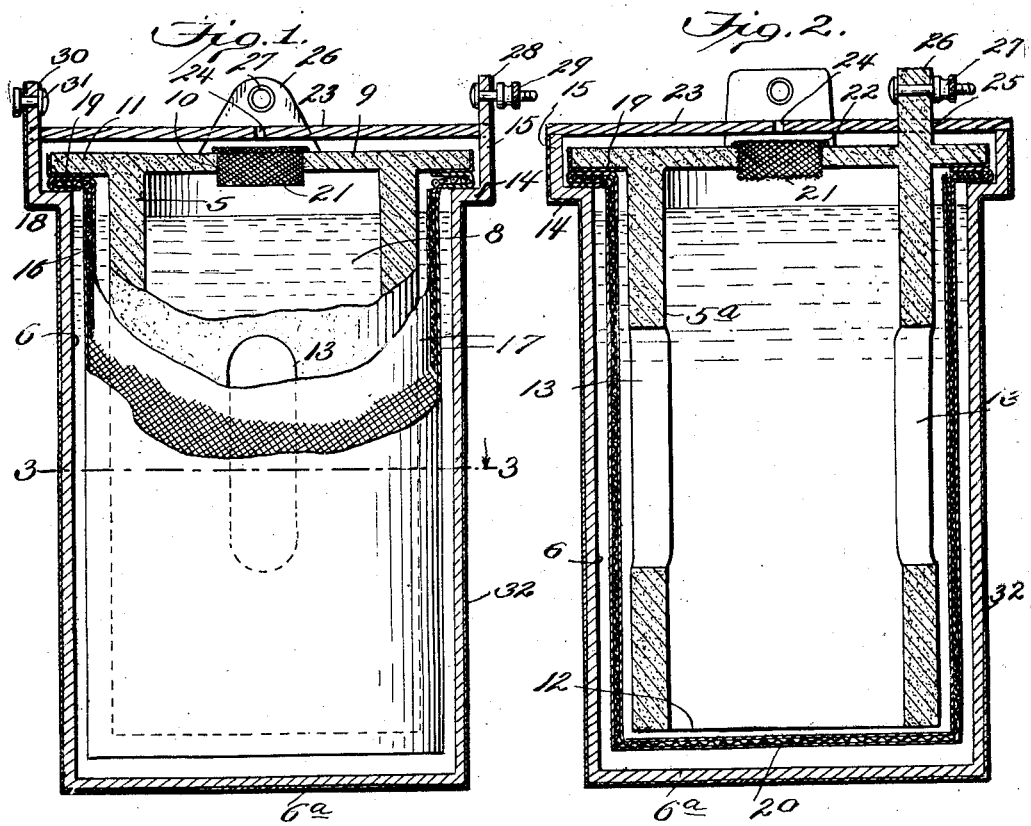
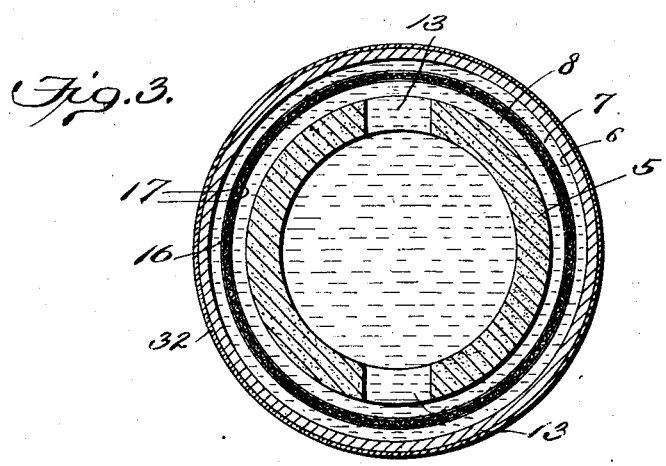
Inventor
George S. Engle
By
Attorney Patented Aug. 2, 1927.

1,637,991

UNITED STATES PATENT OFFICE.

GEORGE S. ENGLE, OF WASHINGTON, DISTRICT OF COLUMBIA.

PRIMARY BATTERY.

Application filed March 6, 1926. Serial No. 92,875.

This invention relates to primary batteries of the type preferably having an alkaline electrolyte.

The present improved primary battery has been devised to prevent the deposit of particles thrown off or separated from an interiorly located negative element on the inner surface of an outer surrounding positive element, by interposing between the two elements a filtering partition or fence which will permit free circulation and contact as well as chemical coaction of the electrolyte with relation to the elements, and thereby materially prolong the active and efficient life of the battery, with obvious advantages in economical battery service.

Another advantage of the improved battery is that its maximum voltage and amperage will be maintained constant for a longer period than is possible in batteries devoid of means for preventing electrolytical deposit of particles thrown off of one element onto the remaining element or elements.

The invention consists in the preferred construction and arrangement of the several parts which will be more fully hereinafter described and claimed.

In the drawings:

Fig. 1 is a sectional elevation of a battery cell embodying the features of the invention.

Fig. 2 is a transverse, vertical section taken in a plane at right angles to the sectional parts shown by Fig. 1.

Fig. 3 is a horizontal section on the line 3—3, Fig. 1.

The improved battery comprises as its essential parts an inner negative element 5, preferably formed of amorphous carbon, an outer metallic positive element 6, preferably of gray cast-iron, a filtering partition 7, and an alkaline electrolyte 8. The amorphous carbon negative element 5 is of tubular form and has a flat top closure member 9 with a central opening 10 and a surrounding flange 11, which serves as a support relatively to the outer metallic or gray cast-iron positive element. The lower end of the amorphous carbon element 5 is fully open, as at 12, and at diametrically opposite points the tubular body 5ª is formed with longitudinal slots 13 extending therethrough. The top portion of the outer gray cast-iron positive element 6 is diametrically enlarged, to provide a horizontal seat or ledge 14, from which a surrounding flange 15 extends upwardly a predetermined distance.

The filtering partition or fence 7 comprises an inner copper wire screen 16, of suitable mesh, having a filtering paper 17 applied over the exterior and interior thereof, and the enclosed wire mesh screen is bent outwardly to form a top support 18, which is disposed on the ledge 14 of the outer gray cast-iron element 6, the flange 11 of the top closure 9 of the amorphous carbon element 5 having a rubber covering or gasket 19 applied thereto and directly engaging the upper supporting flange 18 of the filtering partition or fence. The filtering partition or fence corresponds in shape to the elements 5 and 6, or is cylindrical, being of greater diameter than the amorphous carbon element 5 and of less diameter than the outer surrounding gray cast-iron element 6. The bottom 20 of the filtering partition or fence is fully closed and the wire screen and filtering paper components are continued over the bottom in the same manner as at the side and upper flange 18 thereof. The upper surface of the bottom 20 of the filtering partition or fence 7 is normally located a slight distance below the lower termination of the open bottom 12 of the amorphous carbon element 5 and is also disposed a predetermined distance above the bottom of the gray cast-iron positive element 6, which serves as a container, as clearly shown. The bottom 6ª of the outer cast-iron element is flat so as to provide a stable support for the cell. The purpose of the wire screen 16 between the layers or enclosures of filtering paper 17 is to provide a supporting frame structure for the filtering paper and prevent the latter from becoming displaced by wilting or crumpling when moist, as obviously would be the case if some means were not provided to hold the same in proper shape. While the wire screen 16 between the layers or enclosures of filtering paper 17 is preferred as a frame structure for sustaining the said filtering paper in operative position within the cell, it will be understood that the essential purpose in view is to provide the filtering paper with supporting means irrespective of the specific character of the latter. The wire screen, however, permits passage therethrough of the electrolyte, and what chemical reaction that may be effected with relation thereto by the electrolyte will only add to the efficiency of the cell.

In the opening 10 of the top closure 9 a dished, fine wire gauze, hollow plug 21 is inserted, the said plug being fully open at its top and closed at the bottom and having a top rim 22 which bears on the upper surface of the closure 9 around the opening 10. The cell is completed by a top cover 23 of suitable material, which is securely fastened to the upper edge of the flange 15 of the outer gray cast-iron positive element 6 and has a central breathing opening 24 formed therein directly above the fine wire mesh plug 21. The purpose of the closing plug 21 and the breathing opening 24 is to permit hydrogen to freely egress from the interior of the cell and also provide for ingress of atmospheric air to the interior of the cell. The mesh of the hollow plug 21 is very fine but will permit outward escape of the hydrogen and ingress of atmospheric air as just explained, and at the same time prevent splashing out or leakage above the closure 9 of the electrolyte. The top cover 21 has an outer opening 25 therein, through which a terminal connecting arm 26, extending upwardly from the closure 9, projects and is provided with a suitable binding post 27 for attachment of the terminal of one of the connecting wires for the battery. The flange 15 of the outer positive gray cast-iron element 6 also has an arm or connecting extension 28 projecting upwardly therefrom and provided with a binding post 29, for attachment thereto of the terminal of the remaining connecting wire of the battery, and at an opposite point is a similar extension 30, which may be closed by a headed pin 31, for convenient use in making a connection at this portion of the cell.

The electrolyte 8 may be of any suitable alkaline character, there being a number of these electrolytes particularly adapted for the purpose, and will be introduced into the cell prior to application of the top cover 23, and by removing the hollow wire screen plug 21, the electrolyte being poured downwardly through the opening 10 in the top closure 9 and enters the interior of the negative amorphous carbon element 5 and passes out through the openings or slots 13 of the latter element and gradually seeps through the partition or fence 7, the supply of electrolyte being continued until it has reached approximately the level shown in Figs. 1 and 2. The electrolyte will gradually seep through the layers or enclosures of filtering paper 17 and come in contact with the outer positive gray cast-iron element 6. After the cell has been supplied with the requisite quantity of electrolyte, the wire gauze hollow plug 21 will be pressed downwardly through the opening 10 in the position shown and the cover 23 then applied and suitably secured to seal the cell. The outer side or surface and portions of the positive gray cast-iron element 6 and the bottom thereof will have a coating 32 of any suitable or well known insulating cement applied thereto to protect the said element and also retain the current generated fully within the cell for service through the proper terminal connections.

What is claimed as new is:

1. In a primary battery, the combination of an outer gray cast-iron element providing the containing means for the battery and having an upper enlarged extremity to provide a circumferential supporting shoulder, an amorphous carbon element of less diameter and length than the cast-iron element, the amorphous carbon element having a top closure member extended outwardly beyond the element to form a supporting flange which is held by the shoulder of the cast-iron element, a fine wire gauze partition interposed between the sides and bottom of the cast-iron and amorphous carbon elements and also having an upper extremity engaging the said shoulder between the flange and the amorphous carbon element and said shoulder, a top cover for the battery provided with a central breathing opening, the top closure of the amorphous carbon element also having a central opening with a fine wire gauze plug inserted therein and forming means for breathing purposes, and a liquid alkaline electrolyte primarily introduced into the amorphous carbon element and passing from the latter through the filtering means to the cast-iron element, the electrolyte being introduced through the opening in the top closure member of the carbon element by removing the said plug.

2. In a primary battery, the combination of an inner amorphous carbon element, an outer enclosing gray cast-iron element, a fine wire gauze material interposed between the two elements, and an alkaline electrolyte, the carbon element and the wire gauze material both being spaced from each other and from the sides and bottom of the outer gray cast-iron element, the gauze element also extending over and above the bottom of the cast-iron element and without contact with relation to the carbon element, the carbon element having a suspending member extended across the top thereof and provided with a central filling and breathing opening normally having therein a wire gauze plug of finer mesh than the said interposed wire gauze material.

3. In a primary battery, an inner tubular amorphous carbon negative element having an upper top member continuing thereacross and formed with a central combined filling and breathing opening, a very fine mesh wire gauze plug normally fitted in said opening, an outer gray cast-iron element from the upper portion of which the carbon element is suspended, the carbon element being of materially less diameter than the cast-iron element and of less length than the latter element so that the carbon element will terminate at a distance above the bottom of the cast-iron element, a fine wire gauze material interposed between the side and bottom portions of the carbon and gray cast-iron elements and separated from the latter both at the sides and bottom, and a liquid electrolyte introduced into the carbon element and passed out through the latter and through the said wire gauze material to the cast-iron element, the wire gauze material interposed between the elements preventing deposit of particles of cast off from the amorphous carbon on the inner side and bottom surfaces of the cast-iron gray element.

4. In a primary battery, an inner or amorphous carbon negative element of tubular form having a closed top portion with a central opening therethrough, the said element being provided with openings in opposite side portions thereof and also having a lower fully open bottom, an outer gray cast-iron element in which the carbon element is suspended so that the lower termination of the latter will be disposed above the bottom of the cast-iron element, the carbon element being of less diameter and width than the cast-iron element so that a clear space is provided between the sides and bottom of the carbon and cast-iron elements, a relatively fine wire gauze material between the two elements and spaced from all portions of the said elements, a liquid electrolyte introduced into the carbon element and passed outwardly from the latter through the wire gauze and to the cast-iron element, and a sealing cover above the top portion of the carbon element and provided with a breathing opening.

In testimony whereof I have hereunto set my hand.

GEORGE S. ENGLE.